United States Patent
Hogge et al.

(10) Patent No.: US 7,670,542 B2
(45) Date of Patent: Mar. 2, 2010

(54) INFRARED HEATING METHOD FOR CREATING CURE GRADIENTS IN GOLF BALLS AND GOLF BALL CORES

(75) Inventors: Matthew F. Hogge, Plymouth, MA (US); Michael J. Sullivan, Barrington, RI (US); Derek A. Ladd, Acushnet, MA (US); Peter L. Serdahl, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 1045 days.

(21) Appl. No.: 11/343,151

(22) Filed: Jan. 30, 2006

(65) Prior Publication Data

US 2006/0122011 A1  Jun. 8, 2006

Related U.S. Application Data

(60) Continuation-in-part of application No. 10/341,572, filed on Jan. 13, 2003, now abandoned, which is a division of application No. 10/141,481, filed on May 8, 2002, now Pat. No. 6,855,070.

(51) Int. Cl.
  *A63B 37/06* (2006.01)
  *B29B 5/08* (2006.01)
  *B29C 33/06* (2006.01)
  *B29C 35/08* (2006.01)
  *A63B 37/12* (2006.01)

(52) U.S. Cl. ............... 264/493; 264/492; 264/494; 264/279.1; 264/250; 525/244

(58) Field of Classification Search ............ 264/492, 264/493, 494, 279.1, 250; 525/274; 273/235
See application file for complete search history.

(56) References Cited

U.S. PATENT DOCUMENTS

| | | | | |
|---|---|---|---|---|
| 4,264,075 | A | * 4/1981 | Miller et al. | 473/372 |
| 4,570,937 | A | 2/1986 | Yamada | 273/220 |
| 4,650,193 | A | 3/1987 | Molitor et al. | 273/228 |
| 4,858,924 | A | 8/1989 | Saito et al. | 273/62 |
| 5,484,870 | A | 1/1996 | Wu | 528/28 |
| 5,665,192 | A | 9/1997 | Wolki et al. | 156/188 |
| 5,672,393 | A | 9/1997 | Bachmann et al. | 427/493 |
| 5,677,362 | A | 10/1997 | Bachmann et al. | 522/28 |
| 5,692,974 | A | 12/1997 | Wu et al. | 473/377 |
| 5,697,856 | A | 12/1997 | Moriyama et al. | 473/374 |
| 5,703,166 | A | 12/1997 | Rajagopalan et al. | 525/196 |
| 5,733,206 | A | 3/1998 | Nesbitt et al. | 473/377 |
| 5,803,834 | A | 9/1998 | Yamagishi et al. | 473/377 |
| 5,824,746 | A | 10/1998 | Harris et al. | 525/196 |

(Continued)

*Primary Examiner*—Joseph S Del Sole
*Assistant Examiner*—Nahida Sultana
(74) *Attorney, Agent, or Firm*—D. Michael Burns

(57) ABSTRACT

This invention is directed to a method for creating a triple layer like golf ball core out of a single material. A thermoset material is cured for only a partial period of time in a compression mold, therein creating a short-cured core wherein the innermost region of the core is substantially softer than the outer region. Subsequently, the short-cured core is heated with infrared radiation to create a cure gradient in the skin of the core. This results in a relatively hard skin, which is at least 2 Shore D points harder than the rest of the core. The hardness gradients created in the skin are in the range of about 0.005 inches to about 0.040 inches.

15 Claims, 1 Drawing Sheet

U.S. PATENT DOCUMENTS

| | | | |
|---|---|---|---|
| 5,908,358 A | 6/1999 | Wu | 473/378 |
| 5,976,443 A | 11/1999 | Nesbitt et al. | 264/250 |
| 5,981,658 A | 11/1999 | Rajagopalan et al. | 525/72 |
| 6,024,813 A | 2/2000 | Groeger et al. | 156/62.8 |
| 6,056,842 A | 5/2000 | Dalton et al. | 156/243 |
| 6,113,831 A | 9/2000 | Nesbitt et al. | 264/250 |
| 6,150,462 A | 11/2000 | Rajagopalan et al. | 525/74 |
| 6,162,135 A | 12/2000 | Bulpett et al. | 473/373 |
| 6,174,388 B1 | 1/2001 | Sikka et al. | 148/512 |
| 6,193,619 B1 | 2/2001 | Wu et al. | 473/374 |
| 6,210,294 B1 | 4/2001 | Wu | 473/377 |
| 6,371,870 B1 | 4/2002 | Calabria et al. | 473/370 |
| 6,398,668 B1 * | 6/2002 | Wai | 473/374 |
| 6,967,229 B2 * | 11/2005 | Voorheis | 525/264 |
| 6,982,301 B1 * | 1/2006 | Voorheis et al. | 525/193 |
| 7,108,921 B2 * | 9/2006 | Sullivan | 428/421 |
| 7,547,746 B2 * | 6/2009 | Sullivan et al. | 525/232 |
| 2003/0069085 A1 * | 4/2003 | Hogge et al. | 473/371 |
| 2005/0009992 A1 * | 1/2005 | Voorheis | 525/244 |
| 2007/0270244 A1 * | 11/2007 | Sullivan et al. | 473/377 |

* cited by examiner

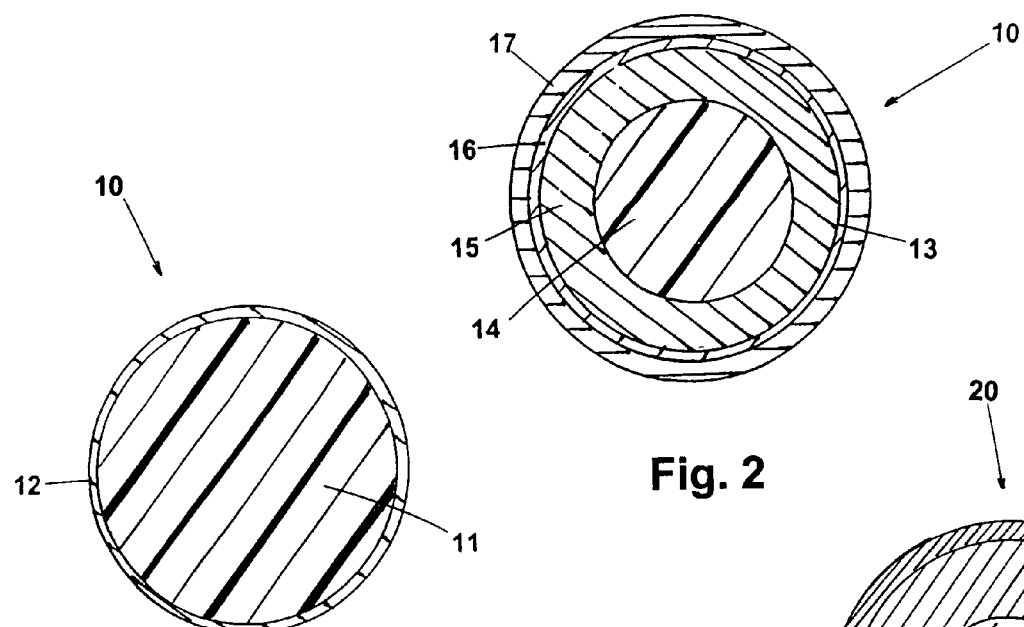
Fig. 2
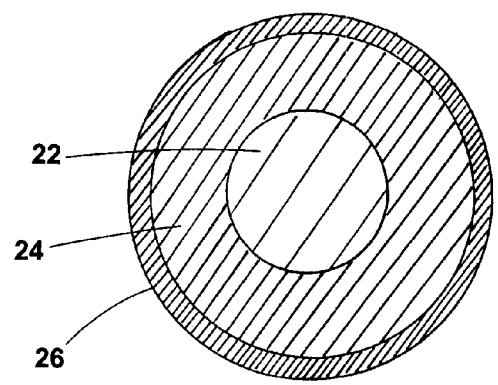
Fig. 1
Fig. 3

INFRARED HEATING METHOD FOR CREATING CURE GRADIENTS IN GOLF BALLS AND GOLF BALL CORES

CROSS-REFERENCE TO RELATED APPLICATION

This application is a continuation-in-part of U.S. application Ser. No. 10/341,572, filed on Jan. 13, 2003 now abandoned which was a divisional of U.S. application Ser. No. 10/141,481, filed May 8, 2002 and issued as U.S. Pat. No. 6,855,070, all of which are incorporated herein in its entirety by express reference thereto.

FIELD OF THE INVENTION

This invention relates to a method of manufacturing a triple layer like golf ball core, and specifically hardness gradients created by infrared radiation in the skin of the core.

BACKGROUND OF THE INVENTION

Generally, golf balls have been classified as wound balls or solid balls. Wound balls are generally constructed from a liquid or solid center surrounded by tensioned elastomeric material. Wound balls are generally thought of as performance golf balls and have a good resiliency, spin characteristics and feel when struck by a golf club. However, wound balls are generally difficult to manufacture when compared to solid golf balls.

Solid golf balls were initially, two piece balls, i.e., comprising a core and a cover. In order to improve the playing characteristics of the golf ball, more recently developed solid balls are comprised of a core, one or more mantle layers and one or more covers.

In the manufacture of solid golf ball cores, all cores have a slight cure gradient. This is a normal result of the cure conditions, which usually heat from the outside in. The current practice is generally to form a core with the most uniformity for the given construction. If it is desired to create cure gradients having large hardness differences across the gradient, or to use materials that are not typical to the art, generally, it has been necessary to use high molding temperatures for long periods of time (i.e. 175° C. for 30 minutes).

The prior art is comprised of a variety of golf balls that have been designed to provide particular playing characteristics. These characteristics are generally the initial velocity and spin of the golf ball, which can be optimized for various types of players. For instance, certain players prefer a ball that has a high spin rate in order to control and stop the golf ball. Other players prefer a ball that has a low spin rate and high resiliency to maximize distance. Generally, a golf ball having a hard core and a soft cover will have a high spin rate. Conversely, a golf ball having a hard cover and a soft core will have a low spin rate. Golf balls having a hard core and a hard cover generally have very high resiliency for distance, but are hard feeling, and therefore lack "touch" and are difficult to control around the greens. Various prior art references have been directed to adding a mantle layer or second cover layer to improve the playability of solid golf balls.

As indicated above, the spin rate of golf balls is the end result of many variables, softness of the cover in relationship to the inner core or an inner mantle layer is but one of these variables. Spin rate is an important characteristic of golf balls for both skilled and recreational golfers. High spin rate allows the more skilled players, such as PGA professionals and low handicapped players, to maximize control of the golf ball. A high spin rate golf ball is advantageous for an approach shot to the green. The ability to produce and control backspin to stop the ball on the green and side spin to draw or fade the ball substantially improves the player's control over the ball. Hence, the more skilled players generally prefer a golf ball that exhibits high spin rate.

On the other hand, recreational players who cannot intentionally control the spin of the ball generally do not prefer a high spin rate golf ball. For these players, slicing and hooking are the more immediate obstacles. When a club head strikes a ball, an unintentional side spin is often imparted to the ball, which sends the ball off its intended course. The side spin reduces the player's control over the ball, as well as the distance the ball will travel. A golf ball that spins less tends not to drift off-line erratically if the shot is not hit squarely off the club face. The low spin ball will not cure the hook or the slice, but the lower spin will reduce the adverse effects of the side spin. Hence, recreational players prefer a golf ball that exhibits low spin rate.

The prior art teaches of having either a soft or a hard intermediate (inner cover) layer formed about a core to achieve particular performances, as seen above, from a golf ball. A means of achieving these types of performance characteristics without the use of any mantle layer may be attainable through the use of gradient curing to create hardness gradients on the outer skin or shell of the golf ball core.

U.S. Pat. Nos. 5,803,834, 5,733,206, 5,976,443, 6,113,831, 5,697,856, 4,650,193, 4,570,937, and 4,858,924 are examples of creating gradients in the core of a golf ball.

SUMMARY OF THE INVENTION

The invention provides a method of making a triple layer like golf ball core by forming a short-cured core out of a single thermoset material, wherein the innermost region of the core is not fully cured and is therein softer than the outer region of the short-cured core. Subsequent to the short-cure heating, the core is then placed on a spindle and spun at about 500 rpm while passing between two infrared radiation sources therein causing a cure gradient in the skin of the outer portion of the short-cured core. The infrared radiation (IR) creates a cure gradient thickness of about 0.005 inch to about 0.04 inch in the skin of the core, and the skin therein obtains a hardness of at least 2 Shore D points greater, preferably at least 5 Shore D points greater, than the outer region of the short-cured core. Thus, the core achieves three very distinct regions of hardness: the softer innermost region; the slightly harder outer region; and, the hardest region, which is that which is formed in the skin by the IR cure gradient.

An object of the invention is forming a golf ball wherein the spin profile of the ball is decreased, and this is the result of the outer region of the core being harder than the innermost region because of the shortened cure that fails to fully cure the innermost portion of a golf ball core and the resultant harder region caused by the IR heating of the skin. Thus the outer portion is harder than the innermost portion, and the IR created third layer is significantly harder than those two portions, and upon a soft cover being applied, a golf ball is created that has both distance as well as "stop and drop" ability.

A preferred embodiment of the invention is forming a golf ball core having a core diameter of about 1.55 inch to 1.62 inches, and preferably greater than 1.585 inches.

The method would form a thin outer skin of the core to have a Shore D hardness greater than 50 and, preferably, greater than 60, with the rest of the core being at least 2 Shore D points softer than the outer skin, and preferably at least 5 Shore D points softer.

An embodiment of the invention method short cures the thermoset material for about 6 to 8 minutes at a temperature between about 315° F. to 340° F., and preferably for 7 minutes at about 340° F. Typically, at these temperatures, the normal curing time is about 11 to 12 minutes. The shorter cure time insures that the innermost region of the core is softer than the outer region.

BRIEF DESCRIPTION OF THE DRAWINGS

FIG. 1 is a cross section of a one piece core of a golf ball with a skin of the core having a cure gradient created by infrared radiation.

FIG. 2 is a cross section of a multi-layered core with the outer layer forming the hardness gradient.

FIG. 3 is a cross section of a three layer type core made of a single material.

DESCRIPTION OF THE PREFERRED EMBODIMENTS

The present invention presents a golf ball core and the method of creating gradients in the skin of the core wherein a three layer like core is produced. The method of the invention would work equally as well with one-piece balls as described in U.S. Pat. No. 6,162,135, multi-layer core balls or a ball made with a laminated construction as described in U.S. Pat. No. 6,056,842, which is incorporated by reference herein in its entirety.

As previously stated, in the manufacture of golf ball cores, all cores have a slight cure gradient that is created by the very nature of the cure conditions, which is heating from the outside in. The cure conditions are optimized to create the cure with the most uniformity for the given construction. If cure gradients that have large differences were desired or if materials that are not typical of the art were desired, then they could be achieved with high molding temperatures for long periods of time (i.e. 175° C. for 30 minutes). Extended periods of time can be very costly in the manufacturing process, and until the present invention three layer like cores have been achieved only through applications of additional layers of material. The present invention utilizes a single material to create a three layer like core.

The present invention employs the method of Infrared Radiation (IR) for creating cure gradients in golf ball cores, and could be used for intermediate layers and cover layers, although the focus of the present invention is limited to the core material, however, it is to be appreciated that IR represents a potential alternative means of cross-linking any portion of a ball.

The Electromagnetic Spectrum includes all types of radiation: Gamma-rays, X-rays, Ultraviolets, visible light, infrared light, microwaves and radio waves. All these rays and waves in the Electromagnetic Spectrum are different only because the length of their waves are different. Short wavelength radiation is of the highest energy and can be very dangerous (X-rays and Ultraviolets). Longer wavelength radiation, which includes IR, is of lower energy and usually is harmless. IR radiation is a very radiant form of heating. It heats objects and people directly, without the need to heat up the air in between. The prefix "infra" is Latin for below and refers to the wavelengths that are below the red end of the visible spectrum. IR radiation is generally split into three wavelengths: short-wave, medium-wave and long-wave. The wavelengths can vary from 0.7 microns to about 100 microns. For each of these types of infra-red heating, there is a wide choice of emitter and wavelength. Selection of the correct type for a particular application is usually critical. The type of wavelength employed in the present invention is the medium-length wherein the emitter operates at bright red heat. The absorption wavelengths of C=C groups which include butadiene is about 6.07 microns. The absorption range for most of the materials reported in this invention fall between about 5 to 6.8 microns. The type of emitter to provide IR in this range are well known by those in the field and medium-wave panels can be easily retrofitted to existing hot air or contra-flow ovens. The following U.S. Pat. Nos. 6,174,388, 6,024,813, 5,677, 362, 5,672,393, and 5,665,192, which are incorporated by reference herein in their entirety, describe various methods of curing with IR (although not of a golf ball core or cover).

The present invention provides a novel methodology in the use of rubbers, curing agents and high temperature peroxides in normal formulations, in such a way that they will not fully cure when molded, but will completely cure when exposed to infrared radiation. Preferably, they will then be completely cured at the first several mils on the surface of the golf ball core/air interface. This results in a highly cross-linked surface and a soft center. This may be completed in a short time span, i.e. 5 minutes if by infrared radiation. The core having been molded, the structural framework will stay intact. The outside core surface will experience high (175-300° C.) temperatures.

The present invention involves a method of creating gradients upon a golf ball. A typical golf ball is described in FIG. 1. The golf ball 10 as manufactured having a core 11 comprising a thermosetting composition having an outer layer (shell) 12 of about 0.001 to 0.050 inches that has a considerably different hardness than any other portion of the core 11. Most preferred is a hard shell 12 over a soft core 11 or core layer. The hard shell 12, soft interior is accomplished via infrared heating of a pre-molded core 11. Alternatively, a soft skin over a hard core can be accomplished by infrared heating, wherein the heating degrades or otherwise softens the skin of the pre-molded core.

The following terms are used in this application. Shore D and C Harnesses are measured by the ASTM method D-2240. "Compression points" refer to the compression scale or the compression scale based on the ATTI Engineering Compression Tester. This scale, which is well known to those working in this field, is used in determining the relative compression of a core or ball. The compression is measured by applying a spring-loaded force to the golf ball center, golf ball core or the golf ball to be examined, with a manual instrument manufactured by the Atti Engineering Company of Union City, N.J. This machine, equipped with a Federal Dial Gauge, Model D81-C, employs a calibrated spring under a known load. The sphere to be tested is forced a distance of 0.2 inch against this spring. If the spring, in turn, compresses 0.2 inch, the compression is rated at 100; it the spring compresses 0.1 inch, the compression value is rated as 0. Thus more compressible, softer materials will have a lower Atti gauge values than harder, less compressible materials. Compression measured with this instrument is also referred to as PGA compression.

As used herein, "COR" refers to Coefficient of Restitution, which is obtained by dividing a ball's rebound velocity by its initial (i.e. incoming) velocity. This test is performed by firing the samples out of an air cannon at a vertical steel plate over a range of test velocities (from 75 to 150 ft./sec). A golf ball having a high COR dissipates a smaller fraction of its total energy when colliding with the plate and rebounding therefrom than does a ball with a lower COR. Unless otherwise noted, the COR values reported herein are the values determined at an incoming velocity of 125 ft./sec.

The term "about," as used herein in connection with one or more numbers or numerical ranges, should be understood to refer to all such numbers, including all numbers in a range.

As used herein, the term "pph" in connection with a batch formulation refers to parts by weight of the constituent per hundred parts of the base composition.

An embodiment of the invention, shown in FIG. 1, employs a one piece core 11 (up to a diameter of about 1.65 inches) that has a cure gradient created by infrared radiation. As such the skin 12 of the core 11 has a Shore D hardness of greater than 50, preferably greater than 60, and a core 11 that is softer than the skin 12 by at least 3 Shore D points and preferably at least 5. The skin 12 of the core 11 will further have a Shore A hardness of about 80 A and preferably greater than 60 C. The gradient can be achieved to a pre-desired depth by controlling the time and temperature of the radiation being applied. The use of various formulation modifications may exploit the infrared heating such as selective use of curatives or higher concentrations of curatives or reactants at or near the surface of the core 11.

In another embodiment, shown in FIG. 2, the invention involves a golf ball 10 comprised of a multi-layer core 13. The core 13 is comprised of a center 14 and at least one outer core layer 15 covering the center 14, wherein the outer core layer 15 is formed on the center 14 wherein a hardness gradient is formed on the skin 16 by infrared heating. A cover layer 17 completes the ball construction. In a preferred embodiment, a soft center is formed and a harder layer is formed over the center. Then, an outer layer is formed on the surface of the harder layer such that the outer layer is at least 3 Shore D points harder than the harder layer, and preferably 5 Shore D points harder. Preferably, the center has a diameter of at least 0.75 to 1.5 inches and the harder layer has an outer diameter of about 1.5 to 1.65 inches. The outer layer preferably has a thickness of about 0.01 to 0.05 inches. Overall, the core preferably has an Atti compression of about 40 to 100.

The IR oven uses infrared radiation to provide high levels of temperatures (from less than 350° F. to about 2000° F.) to the surface and underlying mils of a golf ball core 11. This radiation exposes these outer regions of the core to a higher temperature than the center of the core, therein creating a gradient. The time of exposure and temperature of the oven will provide the depth and degree of curing. Several approaches may be used to create the gradient.

The principles of curing with IR would work equally as well with one-piece, two-piece, multi-core, or multi-cover layered golf balls. Infrared radiation can be used to cross-link any portion of a golf ball, including the cover, coating and any intermediate layer as well as a core layer.

In one embodiment, a core is cured as done in the usual manufacturing process, which is a reasonably full cure. Then, the core is exposed to IR radiation to potentially further harden its skin or shell. The core composition can be made from any suitable core materials including thermoset polymers, such as natural rubber, ethylene propylene rubber or epdiene monomer, polybutadiene (PBD), polyisoprene, styrene-butadiene or styrene-propylene-diene rubber, and thermoplastics such as ionomer resins, polyamides, polyesters, or a thermoplastic elastomer. Suitable thermoplastic elastomers include Pebax®, which is believed to comprise polyether amide copolymers, Hytrel®, which is believed to comprise polyether ester copolymers, thermoplastic urethane, and Kraton®, which is believed to comprise styrenic block copolymers elastomers. These products are commercially available from Elf-Atochem, E.I. Du Pont de Nemours and Company, various manufacturers, and Shell Chemical Company, respectively. The core materials can also be formed from a castable material. Suitable castable materials include those comprising a urethane, polyurea, epoxy, silicone, IPN's, etc.

The polybutadiene rubber composition preferably a halogenated organosulfur compound, a base rubber, a cross-linking agent, a filler, and a co-crosslinking agent. The base rubber typically includes natural or synthetic rubbers. A preferred base rubber is 1,4-polybutadiene having a cis-structure of at least 40%. Natural rubber, polyisoprene rubber and/or styrene-butadiene rubber may be optionally added to the 1,4-polybutadiene. The initiator included in the core composition can be any known polymerization initiator that decomposes during the cure cycle. The cross-linking agent includes a metal salt of an unsaturated fatty acid such as a zinc salt or a magnesium salt of an unsaturated fatty acid having 3 to 8 carbon atoms such as acrylic or methacrylic acid. The filler typically includes materials such as tungsten, zinc oxide, barium sulfate, silica, calcium carbonate, zinc carbonate and the like. The polybutadiene rubber composition preferably includes between about 2.2 parts and about 5 parts of a halogenated organosulfur compound. The halogenated organosulfur compound may include pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts, the metal salts thereof, and mixtures thereof, but is preferably pentachlorothiophenol or the metal salt thereof. The metal salt may be zinc, calcium, potassium, magnesium, sodium, and lithium, but is preferably zinc.

Additionally, suitable core materials may also include cast or reaction injection molded polyurethane or polyurea, including those versions referred to as nucleated, where a gas, typically nitrogen, is incorporated via intensive agitation or mixing into at least one component of the polyurethane. (Typically, the pre-polymer, prior to component injection into a closed mold where essentially full reaction takes place resulting in a cured polymer having reduced specific gravity.) These materials are referred to as reaction injection molded (RIM) materials. Alternatively, the core may have a liquid center.

In another embodiment as shown in FIG. 3, a triple layer like core 20 is made out of a single material. The method of formulating the core 20 is such that a thermoset material, which is usually cured for about 11 minutes at a temperature of 315° F. to 340° F., is only cured for about 6 to 8 minutes, and preferably 7 minutes at 340° F., therein creating a "short-cured" core. This short-cured core is reacted enough to produce a core having a reasonable compression and COR value, but due to the shortness of the cure, the innermost region 22 of the core 20 is not as fully cured as the outer portion 24. This results in a short-cured core in which the outer region 24 is harder than the innermost region 22. Following the short-cure, the short-cured core is placed on a spindle (not shown) which spins at a rate of approximately 500 rpm. The spindle is passed between two infrared heaters (also not shown), one above the cores and one below. The infrared heaters can run from 10% to 100% power which achieves temperature ranges of 150° F. to 560° F. The short-cured cores are located approximately 2.5 inches to 3 inches from the heaters. The lower heater is slightly closer than the top heater and therefore operates at about 10% lower power setting. The more preferable process is about 4 minutes at 70% maximum power. At these conditions the top heater is at 70% and the bottom heater is at 60% achieving an approximate temperature of 410° F. This two stage infrared heating process causes a large hardness gradient as well as pigment discoloration due to the thermal curing gradient. The skin 26 (0.005 inch to 0.04 inch thick) increases in hardness by at least 2 Shore D points, more preferably 5 Shore D hardness points, more than the under layer, which is the outer region. The skin 26 of the core 20 will further have a Shore A hardness of about 80 A and preferably greater than 60 C. The final core 20 looks like and acts like a three layer core, therein creating a golf ball that has a lower spin which inherently means longer distance. it is preferred that the cores 20 have a compression less than 75, more preferably less than 65, and most preferably less than 55.

In yet another embodiment, the core is compounded comprising a material that will only be reactive at a temperature produced by the IR such that the reaction depth is controlled. An example of this would be where a blocked-reactive material is compounded into the entire core, but only that portion which is exposed to the high temperature IR will react, and this depth is controlled by time/temperature.

In still another embodiment the core is compounded comprising of a component that will soften (via degradation, chain scission, etc) upon exposure to IR. The core will first cure to a desired compression and COR value, and then, in a post molding IR treatment, the skin or surface of the core will be altered.

Another embodiment presents a molded core that is partially or even fully cured, then is treated (sprayed, dipped, impregnated, dusted, impinged, etc.) with a material that will only react upon IR exposure thereby altering the core surface properties.

It is to be appreciated that butyl rubbers can be cured by a number of curing agents. Preferred curing agents for golf ball usage include sulphur for butyl rubber, and a peroxide curing agent, preferably zinc peroxide, for halogenated butyl rubbers. Other suitable curing agents may include antimony oxide, lead oxide or lead peroxide. Lead based curing agents may be used when appropriate safety precautions are implemented. Butyl rubbers are commercially available in various grades from viscous liquid to solids with varying the degree of unsaturation and molecular weights. Latex grades are also available.

Golf balls having an intermediate layer may have the intermediate layer cured by an IR method. The mantle layer may be formulated wherein vulcanized PP/EPDM. Santoprene® 203-40 is an example of a preferred the intermediate layer comprises of dynamically vulcanized thermoplastic elastomer, functionalized styrene-butadiene elastomer, thermoplastic polyurethane or metallocene polymer or blends thereof. Suitable dynamically vulcanized thermoplastic elastomers include Santoprene®, Sarlink®, Vyram®, Dytron® and Vistaflex®. Santoprene® is the trademark for a dynamically Santoprene® and is commercially available from Advanced Elastomer Systems. Examples of suitable functionalized styrene-butadiene elastomers include Kraton FG-1901x and FG-1921x, which is available from the Shell Corporation. Examples of suitable thermoplastic polyurethanes include Estane® 58133, Estane® 58134 and Estane® 58144, which are commercially available from the B. F. Goodrich Company. Suitable metallocene polymers whose melting points are higher than the cover materials can also be employed in the intermediate layer of the present invention. Further, the materials for the intermediate layer described above may be in the form of a foamed polymeric material. For example, suitable metallocene polymers include foams of thermoplastic elastomers based on metallocene single-site catalyst-based foams. Such metallocene-based foam resins are commercially available from Sentinel Products of Hyannis, Mass. Suitable thermoplastic polyetheresters include Hytrel® 3078, Hytrel® 3548, Hytrel® 4078, Hytrel® 4069, Hytrel® 6356, Hytrel® 7246, and Hytrel® 8238 which are commercially available from DuPont. Suitable thermoplastic polyetheramides include Pebax® 2533, Pebax® 3533, Pebax® 4033, Pebax® 5533, Pebax® 6333, and Pebax® 7033 which are available from Elf-Atochem. Suitable thermoplastic ionomer resins include any number of olefinic based ionomers including SURLYN® and Iotek®, which are commercially available from DuPont and Exxon, respectively. The flexural moduli for these ionomers is about 1000 psi to about 200,000 psi. Suitable thermoplastic polyesters include polybutylene terephthalate. Likewise, the dynamically vulcanized thermoplastic elastomers, functionalized styrene-butadiene elastomers, thermoplastic polyurethane or metallocene polymers identified above are also useful as the second thermoplastic in such blends. Further, the materials of the second thermoplastic described above may be in the form of a foamed polymeric material.

Such thermoplastic blends comprise about 1% to about 99% by weight of a first thermoplastic and about 99% to about 1% by weight of a second thermoplastic. Preferably the thermoplastic blend comprises about 5% to about 95% by weight of a first thermoplastic and about 5% to about 95% by weight of a second thermoplastic. In a preferred embodiment of the present invention, the first thermoplastic material of the blend is a thermoplastic polyetherester, such as Hytrel®.

The present invention also teaches the use of a variety of non-conventional cover materials. In particular, the covers of the present invention may comprise thermoplastic or engineering plastics such as ethylene or propylene based homopolymers and copolymers including functional monomers such as acrylic and methacrylic acid and fully or partially neutralized ionomers and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), reinforced engineering plastics, acrylonitrile-butadiene, acrylic-styrene-acrylonitrile, poly(ethylene terephthalate), poly(butylene terephthalate), poly(ethylene-vinyl alcohol), poly(tetrafluoroethylene) and their copolymers including functional comonomers and blends thereof. These polymers or copolymers can be further reinforced by blending with a wide range of fillers and glass fibers or spheres or wood pulp.

Additional preferred cover materials include thermoplastic or thermosetting polyurethane, such as those disclosed in U.S. Pat. Nos. 6,371,870; 6,210,294; 6,193,619; 5,908,358; 5,692,974; and 5,484,870; and metallocene or other single site catalyzed polymers such as those disclosed in U.S. Pat. Nos. 5,824,746; 5,703,166; 6,150,462; and 5,981,658.

While it is apparent that the illustrative embodiments of the invention herein disclosed fulfills the objectives stated above, it will be appreciated that numerous modifications and other embodiments may be devised by those skilled in the art. Therefore, it will be appreciated that the appended claims are intended to cover all such modifications and embodiments which come within the spirit and scope of the present invention.

What is claimed is:

1. A method of forming a trip layer like golf ball core comprising: providing a thermoset material; forming the thermoset material into short-cured core having a single unitary structure with no outer layer placed about it, wherein the hardness of an innermost portion of the core is less than the hardness of an outer portion; spinning the short-cured core on a spindle; heating the short cured core between two infrared heating sources; and forming a cure gradient in the skin of the outer portion, wherein the skin is at least 2 shore D points harder than the rest of the short-cured core, therein creating three distinct hardness layers within the core, using a single material.

2. The method of claim 1, wherein the cure gradient thickness of the skin is between about 0.005 inch to about 0.04 inch.

3. The method of claim 1, wherein the skin gradient thickness is less than 0.01 inch.

4. The method of claim 1, wherein the short-cured core and triple layer-like core has a diameter between 1.55 inches to 1.62 inches.

5. The method of claim 1, wherein the short-cured core and triple layer-like core has a diameter greater than 1.585 inches.

6. The method of claim 1, wherein the thermoset material is short cured between 6 to 8 minutes at a temperature between about 315 to 340° F.

7. The method of claim 6, wherein the thermoset material is short cured for about 7 minutes at a temperature between about 340° F.

8. The method of claim 1, wherein the hardness of the skin increases at least 5 Shore D across the cure gradient.

9. The method of claim 1, wherein the compression of the short-cured core and triple layer-like core is less than 75.

10. The method of claim 1, wherein the compression of the short-cured core and triple layer-like core is less than 65.

11. The method of claim 1, wherein the compression of the short-cured core and triple layer-like core is less than 55.

12. The method of claim 1, wherein the spinning is at about 500 rpm.

13. The method of claim 1, wherein the method further includes placing a cover over the skin of the core to form a golf ball.

14. The method of claim 1, wherein the hardness of the skin is at least 80 A.

15. The method of claim 1, wherein the hardness of the skin is at least 60 C.

* * * * *